United States Patent [19]

Scholz

[11] 4,220,968
[45] Sep. 2, 1980

[54] CIRCUIT FOR GENERATING A CONSTANT REFERENCE OSCILLATION FROM A VIDEO SIGNAL AFFECTED BY A TIME ERROR

[75] Inventor: Werner Scholz, Gehrden, Fed. Rep. of Germany

[73] Assignee: Ted Bildplatten Aktiengesellschaft Aeg-Telefunken-Teldec, Switzerland

[21] Appl. No.: 946,385

[22] Filed: Sep. 27, 1978

[30] Foreign Application Priority Data

Oct. 8, 1977 [DE] Fed. Rep. of Germany ....... 2745375

[51] Int. Cl.$^2$ ............................................ H04N 5/795
[52] U.S. Cl. .................................... 358/127; 358/148; 360/36
[58] Field of Search ................ 360/36, 37, 26, 33; 358/8, 127, 148; 331/14, 20

[56] References Cited

U.S. PATENT DOCUMENTS

| | | | |
|---|---|---|---|
| 3,863,022 | 1/1975 | Bruch | 360/36 X |
| 3,984,867 | 10/1976 | Harnandez | 360/36 |
| 4,005,476 | 1/1977 | Dickopp et al. | 360/36 |
| 4,028,729 | 6/1977 | Browder | 360/36 X |
| 4,101,940 | 7/1978 | Scholz | 360/36 X |

Primary Examiner—Robert S. Tupper
Assistant Examiner—Donald McElheny, Jr.
Attorney, Agent, or Firm—McGlew and Tuttle

[57] ABSTRACT

A circuit for generating a constant reference oscillation from a video signal affected by a time error, comprising, a cut-off stage for receiving the video signal affected by the time error and outputting sync pulses and vertical sync pulses, a first frequency divider connected to the cutoff stage for receiving the vertical sync pulses and outputting divided frequency pulses and a first comparator stage connected to the first frequency divider for receiving the divided frequency pulses. The first comparator stage has an output connected to an oscillator and the oscillator, in turn, has an output connected to a second frequency divider which is also connected to an input of the first comparator stage. A second comparator stage is connected between the cutoff stage sync pulses and an output of the oscillator for producing an output and a clock oscillator is connected to the output and, in turn, is connected to a bucket chain which receives the video signal affected by the time error and outputs a video signal which is free of the time error.

12 Claims, 8 Drawing Figures

CIRCUIT FOR GENERATING A CONSTANT REFERENCE OSCILLATION FROM A VIDEO SIGNAL AFFECTED BY A TIME ERROR

FIELD AND BACKGROUND OF THE INVENTION

This invention relates to circuits for compensating time errors in video signals in general and, in particular, to a new and useful circuit for generating a constant reference oscillation from a video signal affected by a time error.

DESCRIPTION OF THE PRIOR ART

A video signal originating with a video recording unit, for example, a videotape unit or TV-storage disc player, is generally affected by time errors. These errors are produced by unavoidable speed fluctuations, expansions or deformations in the recording carrier or medium. In order to compensate for such time errors, it is known from "Fernseh-und Kinotechnik", No. 4, 1976, pp 109-112 to carry a video signal via an electronically controlled delay line, the timing of which is varied by a manipulated variable as a function of the time error. The delay line can thereby act as an electronically clocked storage, e.g., a bucket chain, the timing of which is affected by a clock oscillator originating clock pulse sequence of controllable frequency. The oscillator is thereby controlled by a manipulated variable, which is obtained by a phase comparison of video signal cutoff line sync pulses with reference pulses of known phase and frequency.

In the prior art disclosure, the reference pulse supplying oscillator is synchronized with video signal cutoff line sync pulses via a phase control loop having a high time constant. The advantage of this solution is that the reference pulses have the correct average phase relationship with video signal pulses and that the oscillator frequency can follow slow frequency variations in the video signal as required. This is important, for example, if the recording carrier constantly runs at too low or too high a speed. An absolutely constant reference oscillator would then have an incorrect frequency. The purpose of a high time constant is that any time-base fluctuations present in the video signal, which hereafter will be desginated as time errors, possibly do not affect the frequency and phase of the reference pulses.

In practice, it has been shown that the reference oscillator still follows, if only to a minor extent, any time errors, meaning that it does not put out constant-phased reference pulses in the required manner. Although this error would not occur with a constant, free-swinging, video signal unaffected oscillator, the latter, as previously explained, never assumes a constant, average-phase relation relative to video signal pulses because of the ever present minor frequency differentials.

SUMMARY OF THE INVENTION

The object of the present invention is to eliminate any undesirable phase variation of a reference oscillator which produces reference pulses as a function of time errors. The object is thus to produce reference pulses which are unaffected by time error despite the synchronization by the pulses of the video signal which is affected by the time error.

The invention is based on the following findings: Under practical conditions, the described time error generally has a periodic sequence. This period, for example, with a TV-storage disc player, where a complete picture is recorded on one disc circumference, amounts to 25 Hz. This can be explained by the fact that, for example, with a video disc having an eccentricity or bulge thereon, a time error repeats itself with a 25-Hz frequency because of the 1500 rpm applied to the disc. Sync pulses of the time error affected video signal, which are gated only briefly according to the time error period, no longer contain any time error data because they always have the same time deviation relative to the signal which is assumed to be error-free. The timed, periodically varying time error sequence then with the invention will always be gated at the same periodically timed point, so that the same value results practically at all times. If the reference oscillator is now synchronized with these periodically gated pulses via a phase control loop, it then supplies constant reference pulses independent of the actual time errors.

The various features of novelty which characterize the invention are pointed out with particularlty in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The description of a preferred embodiment is based on the example of a TV-storage disc player, where a complete TV-picture is recorded on one video disc circumference, which is played back at 1500 rpm.

Figure 1:
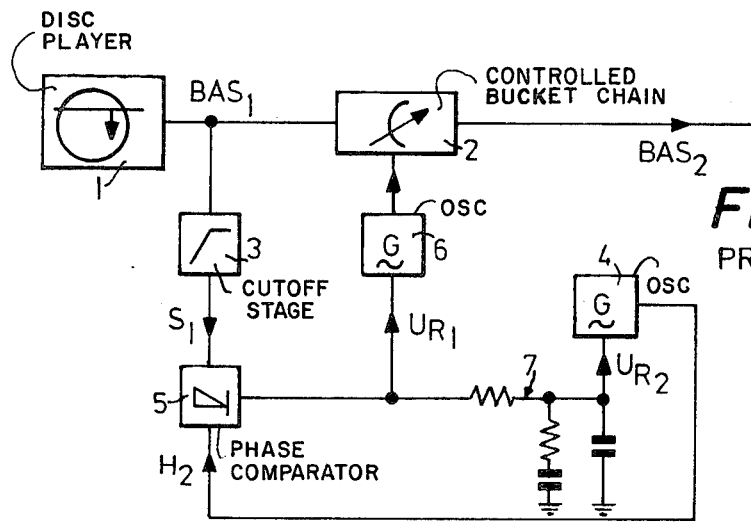
FIG. 1 is a block diagram showing a circuit for time error compensation.

In FIG. 1, a time error affected video signal $BAS_1$, which originates from video disc player 1, is converted into a time error free video signal $BAS_2$ by means of an electrically controlled bucket chain 2. The line sync pulses $S_1$ which is cut off from the video signal with cutoff stage 3 and line frequency reference pulses $H_2$ originating from reference oscillator 4 are compared with each other in a phase comparator stage 5. The manipulated variable $U_{R1}$ obtained in this way is a function of the time error and controls the frequency of clock pulses produced by a clock oscillator 6. These pulses determine the transit time of bucket chain 2. The transit time of bucket chain 2 is so controlled by manipulated variable $U_{R1}$ that a time error-free video signal $BAS_2$ is applied to the output of bucket chain 2. Manipulated variable $U_{R1}$ with a high time constant relative to the line period acts as control voltage $U_{R2}$ on oscillator 4 via filter section 7 and synchronizes oscillator 4 to an average frequency and phase of signal $BAS_1$-line sync pulses.

With this circuit, the reference pulses $H_2$ can still follow any time errors in signal $BAS_1$, even at a high time constant of filter section 7, so that manipulated variable $U_{R1}$ does not quite assume its correct value. With this circuit, a constant control of the frequency and phase of oscillator 4 takes place by the continual sequence of line sync pulses from cutoff stage 3.

Figure 2:
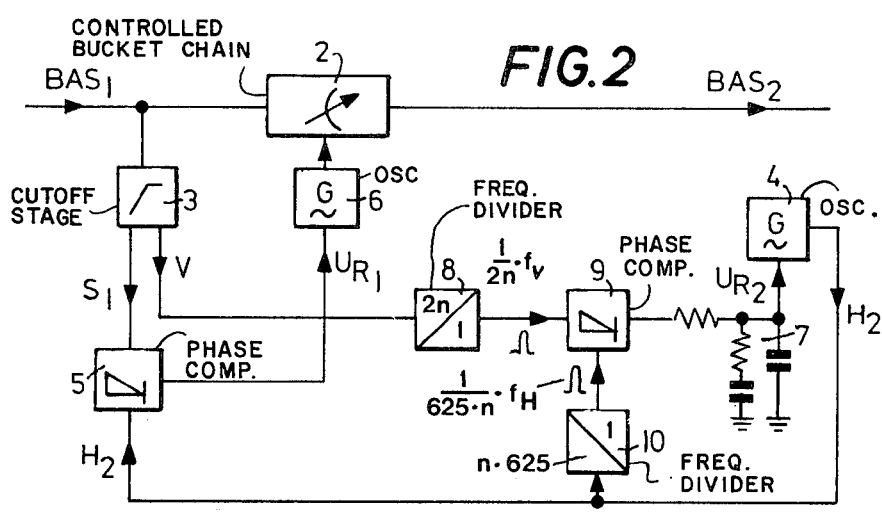
FIGS. 2 and 3 are block diagrams of embodiments according to the invention.

In FIG. 2, oscillator 4 is synchronized by vertical sync pulses V only, which are obtained in cutoff stage 3 from time error affected video signal $BAS_1$. These pulses are matched with the basic frequency of time errors by using a first frequency divider 8. Since, with a video disc, this basic frequency amounts to 25 Hz, in this example, N=1. Thus, the phase comparator stage 9 obtains sync pulses at a video frequency of 25 Hz. Reference pulses $H_2$ are also fed to phase comparator stage 9 via frequency divider 10, which divides by a factor of 625 and thus equally supplies divided frequency pulses to phase comparator stage 9 with a repeater frequency of 25 Hz. It is evident that with this circuit, the gating of the signal $BAS_1$-frequency is effective only at the start of each picture and, thus, all time errors, which appear during the period of a picture, have no effect on the frequency and phase of reference pulses $H_2$ from oscillator 4. Manipulated variable $U_{R1}$, which is obtained in phase comparator stage 5, as shown in FIG. 1, however, remains a function of the time errors and serves, as in FIG. 1, to compensate for these errors.

With this circuit then, the phase comparator stage 9 operates at 1/625th the frequency of phase comparator stage 5. This circuit is particularly suitable in cases where no higher time error frequencies are present, so that it allows for feeding pulses $S_1$ and $H_2$ to phase comparator stage 5 via frequency dividers. On dividing both frequencies by two, the tolerable time-fluctuating range is doubled.

Figure 3:
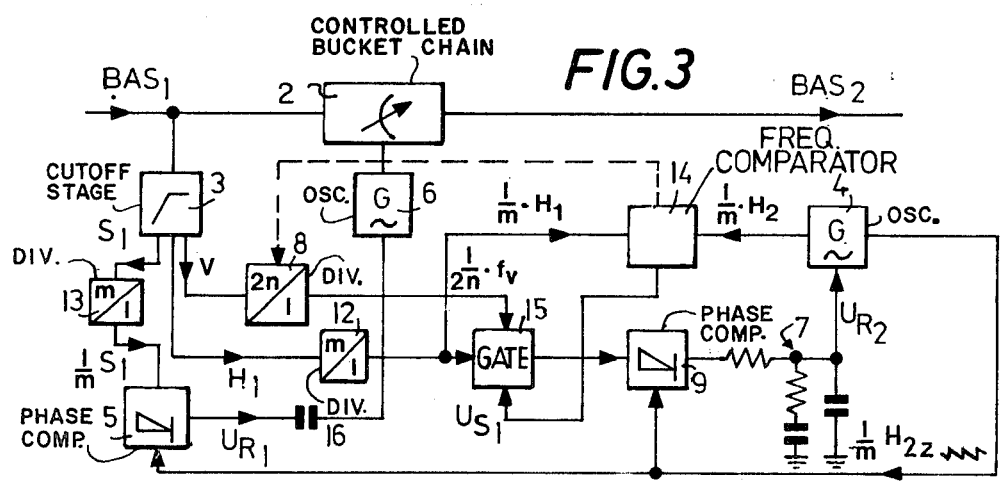

In FIG. 3, both phase comparator stages 5 and 9 obtain the same high linear saw tooth voltage $H_{2z}$. With a suitable design, oscillator 4 can be directly tapped for this voltage.

Figure 4:
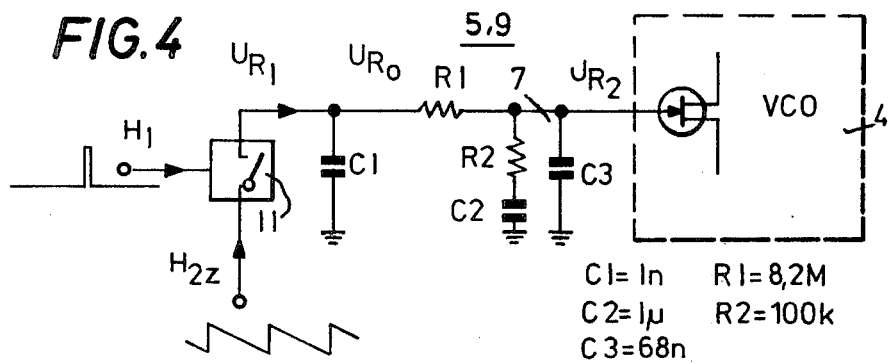
FIG. 4 is a schematic diagram of a phase discriminator for the reference oscillator.

FIG. 4 shows an example for the design of phase comparator stage 5, 9. Phase comparator stage 5 or 9 applicably contains a switch 11, which is briefly closed by pulses $S_1$ and/or $H_1$, so that the applicable instantaneous value of sawtooth voltage $H_{2z}$ is transmitted to capacitor $C_1$ at the output of switch 11. Using phase comparator stage 5, this voltage value is stored until the next gating instant. With phase comparator stage 9, the gatings take place at substantially longer intervals but, here too, the circuit at the output of switch 11 is of such high impedance that the total loading volume of capacitors $C_1$, $C_2$ and $C_3$ remain practically unchanged. Because of matched gating and time error periods, the closure of switch 11 always takes place at the same point of the sawtooth voltage. Therefore, practically no current flows via the switch. The voltages $U_{R0}$ and $U_{R2}$ at the input of oscillator 4, and thus, the frequency of reference pulses $H_2$, therefore remain constant as required.

In the circuit, according to FIG. 3, the cutoff stage 3 comprises a flywheel or phase-locked loop oscillator with a low time constant, which supplies pulses $H_1$. The $H_1$-oscillator serves for the suppression of interference pulses. However, being staged immediately after $S_1$-time fluctuations, cutoff stage 3 may also provide various blanking, gating and clamping pulses required in the circuit.

To explain the operation, it is assumed that the divider factor m of frequency dividers 12 and 13 equal 1. In this case, the dividers can be omitted. Oscillator 4, therefore, oscillates directly at line frequency.

On applying video signal $BAS_1$ to the circuit according to FIG. 3, that is, for example, on starting a video disc, $H_1$ immediately assumes the frequency of pulses $S_1$. Because of the higher time constant of filter section 7, $H_2$ requires more time. Frequency comparator stage 14 detects that oscillator 4 is not yet phase-synchronized and controls gate 15 by voltage $U_{S1}$ at a constant conducting state, so that phase comparator stage 9 obtains a continual sequence of pulses $H_1$ without any interruption.

Figure 5:
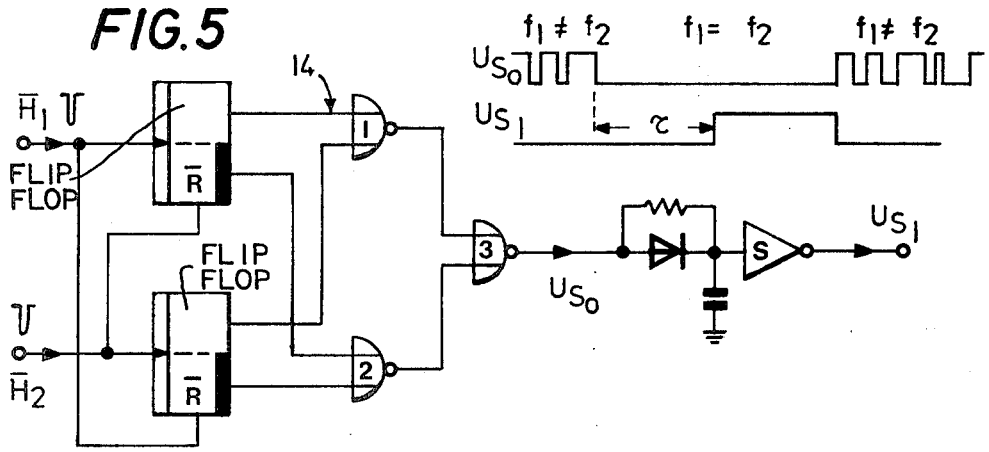
FIG. 5 is a schematic diagram of a frequency reference circuit for monitoring a phase controlled operational state with some of the signals graphically illustrated.

FIG. 5 shows the practical assembly of frequency comparator stage 14. Oscillator 4 then arrises at a synchronized state in the conventional way. As soon as this is accomplished, the pulses at both inputs of frequency comparator stage 14 can appear only in alternate sequence. The result is that $U_{so}$ remains at the L-level. With delay $\tau$ (See FIG. 5), then $U_{S1}$ transfers to the H-level. This activates gate 15, which, at each second pulse V, passes through one or several pulses $H_1$ to phase comparator stage 9. Time $\tau$ is so high that during this time, the mechanical drive of the TV-disc player 1 is oscillated to a complete level. The frequency of these oscillations lies below the lowest frequency of time errors and, therefore, can result in interferences with the gated operating mode of the phase control circuit. Any interference is detected by frequency comparator stage 14. In this way, gate 15 is switched wihout delay into an ineffectual state so that synchronization again takes place with a continual sequence of pulses $H_1$. Picture interferences thereby hardly appear because in this operating mode, a sufficient time error compensation is also present.

Figure 6:
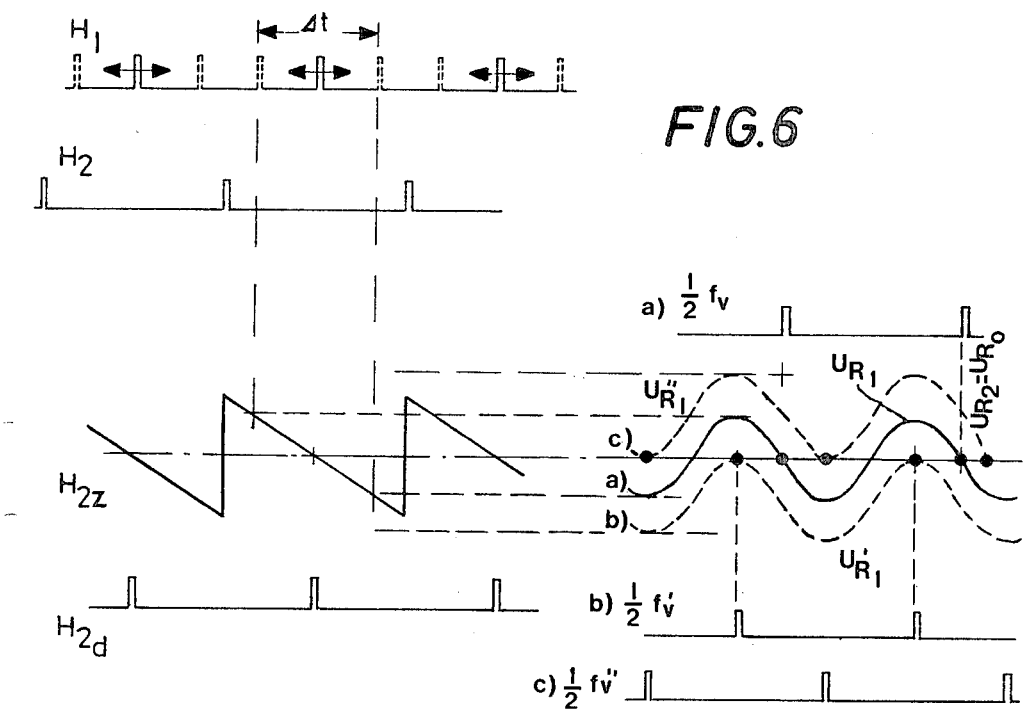
FIG. 6 is a graph showing interrelated characteristic curves for explaining the operation of the circuit according to FIG. 5.

FIG. 6 explains the operation of the circuit according to FIG. 3 in more detail. On synchronizing with each pulse $H_1$, the voltage $U_{R1}$-setting at the output of both phase comparator stages 5 is independent from the way the eccentricity, which produces the basic oscillation of the time error, is set relative to pulses V stored on the video disc.

Unfavorable conditions can be produced following the switchover from standard operation, that is, the synchronization of oscillator 4 with an uninterrupted pulse sequence S, to gated operation, when the video disc supplies only two partial pictures per revolution and pulses V coincide with the extreme values of the time error. A voltage $U_{R1}'$ and/or $U_{R1}''$ would be produced at the output of phase comparator stage 5 as a function of the resetting of divider 8. Under gated operating conditions, voltage $U_{R0}$ at the output of phase comparator stage 9 must coincide with $U_{R2}$. The gating point is then always set at the center of the sawtooth slope. In cases (b) and (c) shown in FIG. 6, the period of the sawtooth slope would then be insufficient for the fluctuation, and frequency comparator stage 14 would switch back to ungated operation. Such a high fluctuation can be remedied in such a way that a phase comparison is made at half the line frequency, that is, m=2. Oscillator 4 then oscillates at frequency $\frac{1}{2} \cdot f_H$, and in the pulse S₁ and H₁ trains applicably one divider with a divider factor 2 is effective.

Introducing such frequency divisions is also useful if more than two partial pictures per video disc revolution are recorded, i.e., four or eight half pictures per revolution. The time fluctuation Δt is proportional to the fluctuation period rated at the same relative frequency fluctuation of time error affected video signal BAS₁. With four and more half pictures per time error basic oscillation, however, the advantage is that V can be selected for gating a pulse with such a setting that the phase control range maximally is extended to only a minor extent.

Thus, for example, an additional pulse can be fed to frequency divider 8 for pulse V on each response of frequency comparator stage 14. In this way, the gated phase comparison finally drifts to a pulse V, where the control then remains at a stable rate. An isolating capacitor 16, shown in FIG. 3, at the input of oscillator 6 is required because the direct voltage value of $U_{R1}$, as shown in FIG. 6, can differ for operation with constant and with gated phase controls.

Figure 7:
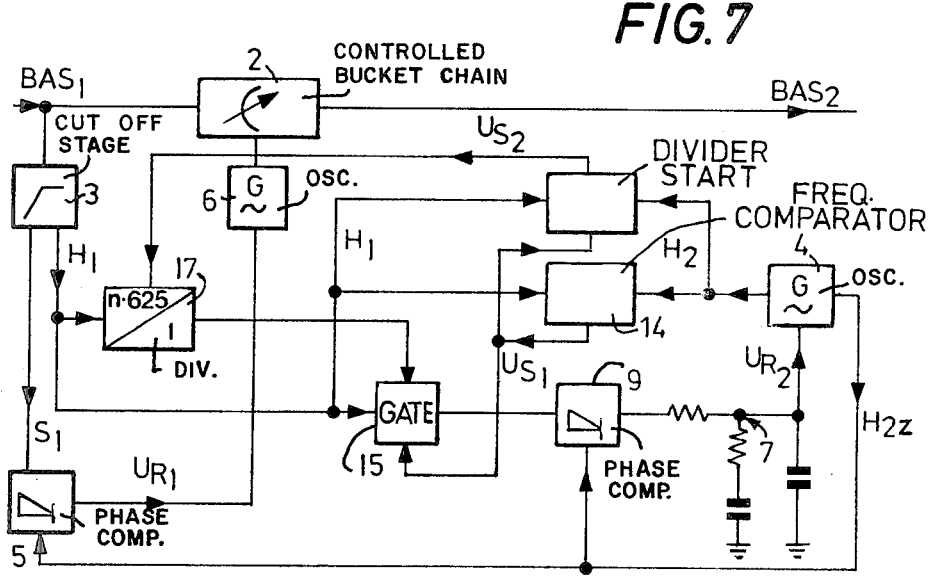
FIG. 7 is a schematic diagram of a further embodiment of the invention.

FIG. 7 shows a circuit for a particularly trouble-free transition from constant phase control of oscillator 4 to gated phase control. In this circuit, the dividers 12 and 13 of FIG. 3 are omitted. For the pulse H₁-conducting control of gate 15 according to the longest time error fluctuating period after applicably n complete pictures a gate pulse is produced from pulses H₁ with a frequency divider 17 having a divider factor n·625. This pulse can be applied to any given phase of time error fluctuation by starting divider 17 at the pertinent point in time.

Figure 8:
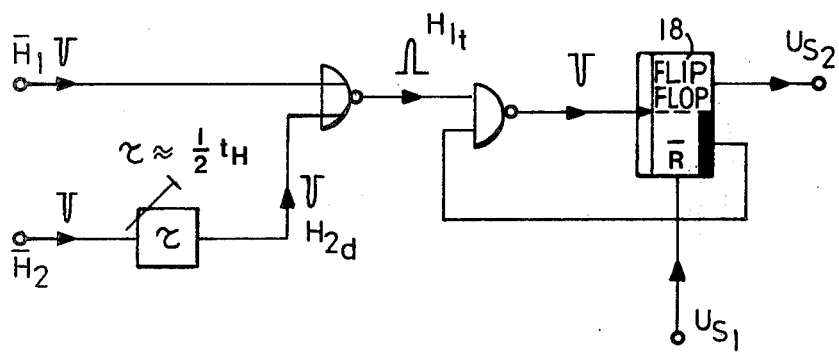
FIG. 8 is a graph of characteristic curves to explain the operation of the circuit according to FIG. 7, accompanied by details of the circuit.
Figure 8:
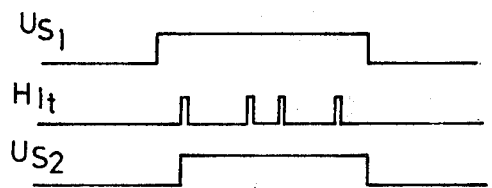

FIG. 8 shows a circuit for starting divider 17 in FIG. 7. Flip-flop 18 is released by voltage $U_{s1}$ as soon as the control of oscillator 4 has been built up by constant phase comparison. With the first pulse H₁ then, which, for example, coincides exactly with the center of the sawtooth slope ($\tau = \frac{1}{2} \cdot t_H$, variable), voltage $U_{s2}$ shifts to the H-level and starts divider 17. A first gate pulse is thereby put out for gate 15. Subsequently, after applicably n·625 pulses H₁, that is, after applicably one full time error period, a further gate pulse for gate 15 follows. This circuit produces a maximally interference-free transition between constant and gated oscillator 4-controls and in gated operation does not require a wider level control range of phase comparator stages 5, 9 than with a constant phase control.

While specific embodiments of the invention have been shown and described in detail to illustrate the application of the principles of the invention, it will be understood that the invention may be embodied otherwise without departing from such principles.

What is claimed is:

1. A circuit for generating a constant reference oscillation from a video signal affected by a time error, comprising, a cutoff stage for receiving a video signal affected by a time error and outputting sync pulses and vertical sync pulses, a first frequency divider connected to said cutoff stage for receiving said vertical sync pulses and outputting divided frequency pulses, a first comparator stage connected to said first frequency divider for receiving said divided frequency pulses and having an output, an oscillator connected to said output of said comparator stage and itself having an output, a second frequency divider connected to said output of said oscillator and having an output connected to said first comparator stage, a second comparator stage connected between said output of said oscillator and said sync pulses of said cutoff stage and itself having an output, a clock oscillator connected to said output of said second comparator stage, and a bucket chain connected to an output of said clock oscillator and receiving the video signal affected by the time error for outputting a video signal free of the time error.

2. A circuit for generating a substantially constant reference oscillation from a time error affected video signal, specifically for time error compensation with a recording unit, having an oscillator which is synchronized by video signal cutoff sync pulses via a phase-locked loop control circuit with phase comparator for conducting a phase comparison between the video signal cutoff sync pulses and the output of the oscillator, where the time error has a periodic sequence, comprising, means connected to said oscillator for periodicially phase-controlling it by the time error period or an integral multiple thereof.

3. A circuit, as claimed in claim 2, wherein said oscillator oscillates with line frequency $f_H$ or a fraction $1/m \cdot f_H$ of said frequency, and the phase comparison for phase control is effective at vertical frequency $f_v$ or a fraction $1/2n \cdot f_v$ of said frequency where n and m are integers.

4. A circuit, as claimed in claim 2, wherein said phase-control is effective at line frequency $f_H$ or $1/m \cdot f_H$, and including a periodically opened gate which is set in the path of the phase control loop, where m is an integer.

5. A circuit, as claimed in claim 2, wherein said phase-control is gated applicably only during vertical blanking time.

6. A circuit, as claimed in claim 1, wherein for the phase-comparison in the phase-locked loop, sawtooth voltages at frequency $1/m \cdot f_H$ are used, where m is an integer.

7. A circuit, as claimed in claim 2, wherein the phase comparison is gated at a frequency $1/2n \cdot f_v$, and wherein the vertical frequency $f_r$ and n are integers.

8. A circuit, as claimed in claim 2, wherein on using the circuit with a video recording unit, a switchover to periodic control is effectively delayed after switching in the video recording unit.

9. A circuit, as claimed in claim 2, wherein the time error varies between positive and negative values and said phase-control is gated only when the time error passes its zero value.

10. A circuit, as claimed in claim 2, wherein said gating period is so timed that at least one full period of frequency $1/m \cdot f_H$ coincides with the gating time, where m is an integer, where $f_H$ is the line of frequency of the oscillator.

11. A circuit, as claimed in claim 2, wherein the circuit can operate both under constant and gated phase control by means of a switchable on- and off gate, and the gated control is switched in only at a steady state and interference-free operation.

12. A circuit, as claimed in claim 11, wherein the transition from steady control to gated control and vice versa is controlled by a frequency standard stage which monitors whether the oscillator originating pulses $1/m \cdot H_2$ and the video signal (BAS₁)-derived pulses $1/m \cdot H_1$ appear in exactly alternating sequence, and where m is an integer.

* * * * *